US006546043B1

(12) United States Patent
Kong

(10) Patent No.: US 6,546,043 B1
(45) Date of Patent: Apr. 8, 2003

(54) METHOD AND APPARATUS FOR CANCELLATION OF MULTIPLE ACCESS INTERFERENCE IN A CODE DIVISION MULTIPLE ACCESS (CDMA) COMMUNICATION SYSTEM

(75) Inventor: Ning Kong, San Diego, CA (US)

(73) Assignee: TRW Inc., Redondo Beach, CA (US)

(*) Notice: Subject to any disclaimer, the term of this patent is extended or adjusted under 35 U.S.C. 154(b) by 371 days.

(21) Appl. No.: 09/606,806

(22) Filed: Jun. 29, 2000

(51) Int. Cl.[7] .................................................. H04B 1/69
(52) U.S. Cl. ...................................................... 375/148
(58) Field of Search ................................ 375/285, 346, 375/347, 267, 316, 148, 147; 455/132–139; 370/335, 342, 441

(56) References Cited

U.S. PATENT DOCUMENTS

| 5,233,626 | A  | * | 8/1993 | Ames ........................ 375/148 |
| 6,178,194 | B1 | * | 1/2001 | Vasic ........................ 375/136 |
| 6,208,683 | B1 | * | 3/2001 | Mizuguchi et al. ......... 375/140 |
| 6,363,103 | B1 | * | 3/2002 | Buehrer et al. ............ 375/148 |

OTHER PUBLICATIONS

Ning Kong, "Average SNR of a Generalized Diversity Selection Combining Scheme," *IEEE Communications Letters*, vol. 3, No. 3, pp. 57–59, Mar. 1999.
T. Eng, N. Kong, and L. B. Milstein, "Comparison of Diversity Combining Techniques for Rayleigh–Fading Channels," *IEEE Transactions on Communications*, vol. 44, No. 9, pp. 1117–1129, Sep. 1996.
M. K. Varanasi and B. Aazhang, "Multistage Detection in Asynchronous Code–Division Multiple–Access Communications," *IEEE Transactions on Communications*, vol. 38, pp. 509–519, Apr. 1990.

D. Divsalar, M. K. Simon and D. Raphaeli, "Improved CDMA Performance Using Parallel Interference Cancellation," *IEEE Transactions on Communications*, vol. 46, No. 2, pp. 258–268, Feb. 1998.
G. Xue, J. Weng, T. Le–Ngoc and S. Tahar, "Adaptive Multistage Parallel Interference Cancellation for CDMA," *IEEE Journal on Selected Areas in Communcations*, vol. 17, No. 10, pp. 1815–1827, Oct. 1999.
A. Paulraj and Eric Lindskog, "A Taxonomy of Space–Time Processing for Wireless Networks," *IEEE Proceedings on Radar, Sonar, and Navigation*, vol. 145, No. 1, pp. 25–31, Feb. 1998.

* cited by examiner

Primary Examiner—Tesfaldet Bocure

(57) ABSTRACT

Cancellation of multiple access interference (MAI) in a CDMA receiver is effected more reliably by the combination of conventional multistage parallel interference cancellation (MPIC) apparatus and the exploitation of space and time diversity to obtain accurate first estimates of multiple user signals received simultaneously at the receiver. The signals are received at multiple, spatially separated receiver antennas (12) providing spatial diversity and over multiple propagation paths, or multipaths, providing time diversity of the received signals. The signals are separated by user in despreaders (60). A processing module (62) selects an optimum subset of the resolvable multipath signal components for each user, to maximize the signal-to-noise ratio (SNR). The selected signals are coherently combined for each user, providing a reliable set of user signal estimates, which are cascaded to the MPIC apparatus for iterative calculation of MAI for each user. Using space and time diversity to obtain the initial set of user signal estimates results in a higher signal-to-noise ratio (SNR) and a lower bit error rate (BER) for every cancellation stage, more reliable operation of the MPIC apparatus, and more rapid convergence of calculated MAI values.

7 Claims, 3 Drawing Sheets

METHOD AND APPARATUS FOR CANCELLATION OF MULTIPLE ACCESS INTERFERENCE IN A CODE DIVISION MULTIPLE ACCESS (CDMA) COMMUNICATION SYSTEM

BACKGROUND OF THE INVENTION

This invention relates generally to techniques for improving performance in communication systems using code division multiple access (CDMA) and, more particularly, to techniques for reducing interference among multiple simultaneous users of communication systems of this type. CDMA is a spread-spectrum form of communication, by which is meant that the information is transmitted as a signal that occupies a bandwidth in excess of the minimum necessary to send the information. In CDMA, spectrum spreading is accomplished by means of a code that is independent of the data being transmitted. The data modulates the code prior to transmission and then a synchronized code generator at a receiver despreads the received signal and recovers the data.

Multiple users of a CDMA system share the same frequency band and transmit at the same time, but are distinguishable because each user is associated with a different code and the codes are said to be orthogonal, i.e., in theory they are independently detectable in the receiver. CDMA has some significant advantages over alternative techniques for wireless digital communication. One disadvantage is the inherent presence of multiple access interference (MAI) when multiple users are transmitting simultaneously to the same receiver. In a practical communication system, perfect orthogonality is lost because, even if perfectly orthogonal codes are used for each user signal, signal fading and frequency errors result in loss of orthogonality. Further, since there is only a limited number of orthogonal codes, pseudo noise (PN) codes are also used in CDMA systems. Because PN codes are not perfectly orthogonal, the user signals will, to some degree, be subject to mutual interference, i.e., MAI. In the context of a mobile communication system, a single base station receiver may be simultaneously receiving signals from multiple users in the same geographic "cell" served by the base station. An important measure of performance in communication systems generally is signal-to-noise ratio (SNR). More specifically, in digital communication the ratio is termed $E_b/N_0$, or energy per bit noise power density. In this specification, the term SNR will be used, but it will be understood that this refers to the more specific term $E_b/N_0$ In CDMA, the noise component in the signal-to-noise ratio includes not only random, and often uncontrollable, noise introduced in the radio-frequency (RF) communication channel, but also any interference introduced by transmissions of other users. For any particular user, user #1, for example, the transmissions, if any, of user #2 and users #3 through #N are noise contributions so far as user #1 is concerned. In early versions of CDMA, multiple access interference (MAI) was recognized as a natural consequence of serving multiple users in a single cell, but the only solution considered was to reduce the number of users that could be served by a single receiver. The presence of MAI affects system performance by limiting system capacity, i.e., the number of users who can share the transmission bandwidth at the same time, and degrading voice quality for each user.

More recently implemented CDMA systems have attempted to mitigate MAI in order to achieve the twin benefits of increased capacity and improved voice quality. Prior to the present invention, MAI mitigation has been achieved to some extent by means of a technique referred to as multistage parallel interference cancellation (MPIC). Initially, MPIC detects signals for all users and then estimates the multiple access interference imposed on each user by combining the detected signals of the other users. Interference cancellation is performed by subtracting from each user's received signal the estimated MAI for that user. In a second stage of cancellation, the corrected signals are used to compute second-stage MAI cancellation for each user signal. Although the MPIC approach can provide a significant improvement in system performance, one serious shortcoming is that the results may diverge instead of converging on a progressively more accurate MAI value. The technique relies on accurate detection of data bits for all users at each iteration. If the bit error rate (BER), which is a measure of the effect of noise, does not improve at each iteration, especially in the first few iterations when the interference levels and the BER are higher, then the technique is often prone to error.

More specifically, every stage of MPIC cancels MAI as estimated from the detected data bits of the previous stage. Ideally, performance is improved by each successive MPIC stage, since more and more interference is canceled. Unfortunately, errors in the MAI estimates are inevitable because of non-zero bit error rate (BER), and performance improvement with additional stages is not guaranteed. Recently, partial cancellation of MAI was proposed, where the partiality is implemented by weighting the MAI in proportion to confidence in each bit estimate. If a more reliable MAI estimate is used, MPIC is more likely to converge. (See D. Divsalar and M. K. Simon, "Improved CDMA Performance Using Parallel Interference Cancellation," *IEEE Transactions on Communications*, vol. 46, no. Feb. 2, 1998.) Others have proposed an adaptive MPIC, in which weights are optimized through minimizing the Euclidean distance between the received signal and the weighted sum of each estimated signal by LMS (least mean squares) algorithm. (See. G. Xue, J. Weng, T. Le-Ngoc and S. Tahar, "Adaptive Multistage Parallel Interference Cancellation for CDMA," *ICC'1999*, Vancouver, Canada.)

It will be appreciated from the foregoing that prior art approaches, and specifically MPIC, for reducing the effect of MAI are not completely reliable. Even the enhanced versions of MPIC may not always converge if the BER is significantly high. A simple and more reliable alternative would be beneficial in many applications of CDMA, and the present invention is directed to this end.

SUMMARY OF THE INVENTION

The present invention resides in a method and corresponding apparatus for cancellation of multiple access interference (MAI) in a code division multiple access (CDMA) communication system. To overcome the shortcomings of multiple parallel interference cancellation (MPIC) described above, the present invention uses space diversity gain to achieve a high signal-to-noise ratio (SNR) for each received user signal, thereby obtaining a low initial bit error rate (BER). Successful multiple access interference (MAI) cancellation depends on having a low BER at every stage. A low initial BER results in more effective MAI cancellation in the first and subsequent stages of multistage parallel interference cancellation (MPIC). As described in more detail later in this specification, a low BER is obtained as a direct result of the high SNR achieved from the use of space diversity gain.

Briefly, the method of the invention comprises the steps of: simultaneously receiving at spatially separated multiple antennas, signals transmitted from multiple users, the signals from at least some of the users following multiple propagation paths and arriving at the antennas as resolvable multipath components; for each user signal, selecting from among all of the multipath components received at all of the antennas a subset of resolvable multipath components of the user signal that provides the highest signal-to-noise ratio; and coherently combining the selected subset of multipath components to obtain for each user a single combined received signal for which signal-to-noise ratio has been maximized by use of space and time diversity. It will be understood that, in the context of the present invention, the term "subset" may include the complete set. Thus, a subset of n multipath signal components selected from among L multipath components derived from each of M antennas, may include as many as M×L signals. Therefore, the single composite signal for a particular user may be derived from as many as M×L signals. The method further includes the steps of estimating multiple access interference (MAI) for each user; and subtracting MAI from the received signals to obtain estimates of the user signals compensated for MAI. Preferably, the steps of generating estimates of MAI and subtracting them from the received signals are performed by one or more stages of parallel interference cancellation.

More specifically, the method of the invention includes the steps of receiving signals from multiple users of a CDMA communication system simultaneously, at a plurality of spatially separated antennas, wherein at least some of the signals reach the antennas as multipath components traversing a plurality of different propagation paths; converting the received signals to digital form; separating the signals received at each antenna by multipath component and by user; for each user, selecting a number of signals from all of the multipath components derived from all of the antennas, wherein the signals are selected as having relatively high signal-to-noise ratio; coherently combining the selected signals to produce a high signal-to-noise-ratio (SNR) signal for the desired user. Finally, the method includes performing multistage parallel interference cancellation (MPIC) on the user combined signals obtained by the preceding steps. The method employs both time and space diversity to provide more accurate estimates of user signals. Therefore, multiple access interference is canceled more reliably than by MPIC alone.

Preferably, the step of performing multistage parallel interference cancellation includes spreading the separate composite user signals, using spreading codes associated with the users; computing a set of estimated MAI cancellations, obtained as partial sums of the spread signals, wherein the partial sum for each user is computed as the sum of all of the other user's signals; subtracting each partial sum from the received but not yet despread signals, to obtain a first estimate of spread user signals compensated for MAI; then despreading the spread user signals compensated for MAI in the preceding step; and repeating the preceding steps at least once more to obtain more accurate estimates of the user signals compensated for MAI.

The invention may also be defined in terms of receiver apparatus for cancellation of multiple access interference (MAI) in a code division multiple access (CDMA) communication system. The apparatus comprises multiple antennas for receiving signals from multiple users transmitting simultaneously to the receiver apparatus, the signals from at least some of the users being received as multipath components traversing direct and indirect paths; multiple radio-frequency (RF) receivers coupled to respective antennas; signal processing means coupled to each antenna, for separating the received signals by user and by multipath component; means for selecting for each user a subset of signals from all of the multipath components received through all of the antennas, wherein the selection is made on the basis of maximizing signal-to-noise ratio; means for coherently combining the selected signals for each user, to obtain an initial set of estimated user signals with high signal-to-noise ratios; and a multistage parallel interference cancellation (MPIC) circuit, connected in a cascade arrangement with the foregoing apparatus elements, to provide cancellation of multiple access interference cancellation that operates to reduce the bit error rate for each user. The initial set of estimated user signals derived by the apparatus provides more efficient reliable operation of the MPIC circuit.

In coherently combining the selected signal components for each user, timing and tracking information for any multipath component received at multiple antennas can be shared to facilitate processing.

It will be appreciated from the foregoing summary that the present invention represents a significant advance in CDMA technology. In particular, the invention provides a more reliable approach to cancellation of multiple access interference, and thereby increasing system capacity and improving transmission voice quality. Other aspects and advantages of the invention will become apparent from the following more detailed description, taken in conjunction with the accompanying drawings.

DESCRIPTION OF THE PREFERRED EMBODIMENT

As shown in the accompanying drawings by way of illustration, the present invention is concerned with techniques for reducing or eliminating the effects of multiple access interference (MAI) in code division multiple access (CDMA) communication systems. In CDMA systems, multiple users may occupy a common spread-spectrum frequency band. The multiple information signals are independently recoverable, however, because each user transmitter uses a distinct digital code to spread the transmitted signal. The different codes are separable in a receiver and each digital code is modulated by user information signal. An important measure of system performance in communication system is the signal-to-noise ratio (SNR). In CDMA systems the "noise" includes not only random noise introduced in a radio-frequency (RF) communication channel, but also an interference effect that other users' signals have on any given user. For example, a first user transmitting to a nearby receiver is subject to interference from other users that may be simultaneously transmitting to the same receiver. Presence of this type of interference, as with noise, results in degradation of system performance. Specifically, system capacity is reduced and, in wireless telephony systems, the voice quality in each channel is adversely affected. In the past, designers of CDMA systems addressed this problem by recommending minimization of the number of users that could simultaneously transmit to a common receiver. As CDMA system designs evolved, techniques were developed to attempt cancellation of multiple access interference.

Figure 1:
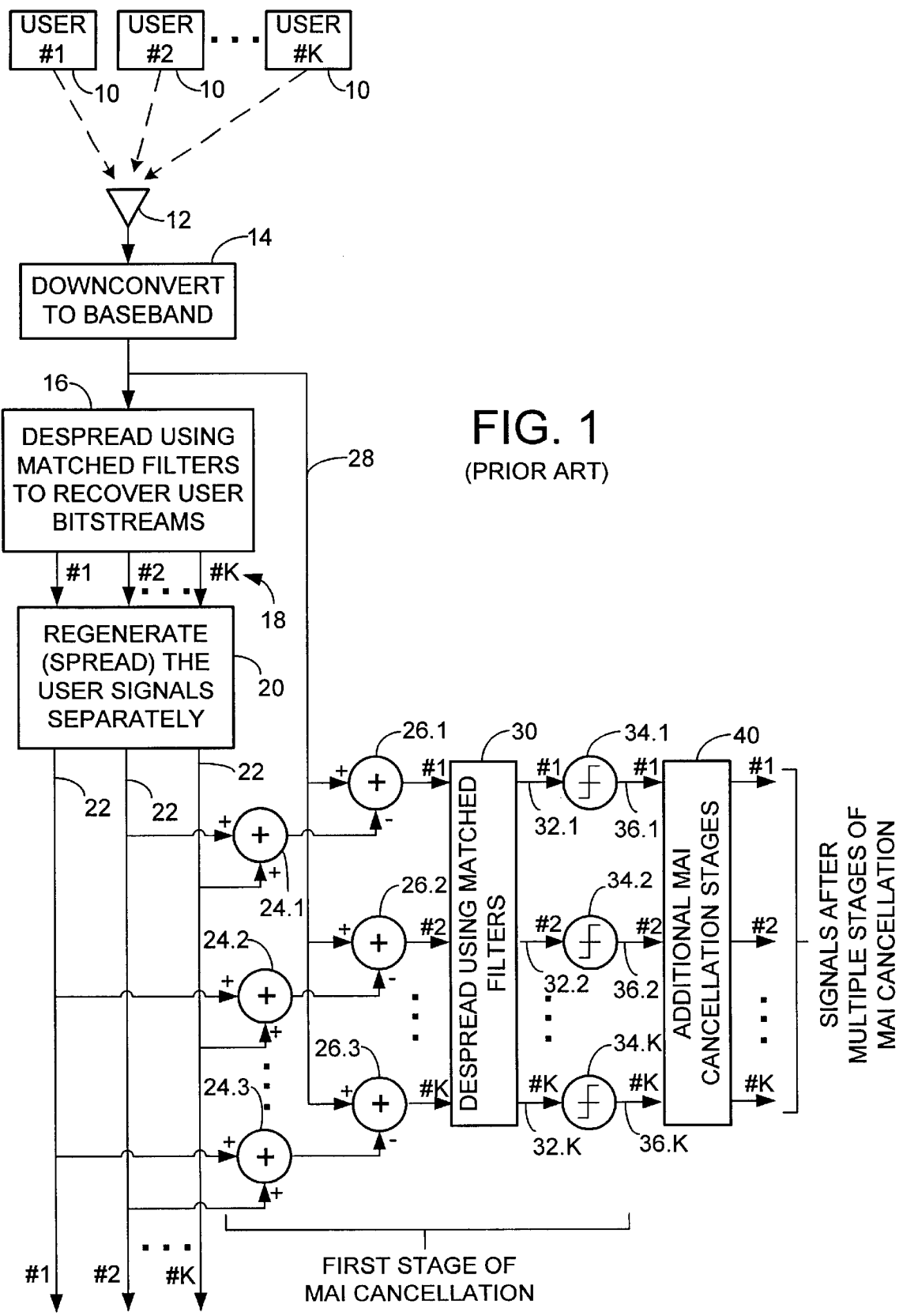
FIG. 1 is block diagram showing how multistage parallel interference cancellation (MPIC) is used to deal with multiple access Interference (MAI) in a code division multiple access (CDMA) communication system.

FIG. 1 shows diagrammatically a known technique referred to as multistage parallel interference cancellation (MPIC). Multiple simultaneously operating user transmitters, three or which are shown at 10, referred to as user #1, user #2 and user #K, generate CDMA transmissions with independent spreading codes that effect recovery of the transmitted data. The signals from the user transmitters 10 are received by a single antenna 12 that is part of a receiver in a communication base station (not shown in full). The received signals are first downconverted to a baseband frequency, as indicated in block 14, and then, as indicated in block 16, are "despread" by processing in a bank of matched filters corresponding to the independent code sequences that were used to spread the original transmissions over a wide frequency band. Despreading the signals permits recovery of the bit streams of data transmitted by the user transmitters 10. Using conventional CDMA receiver processing, despreading and associated decoding steps result in recovery of multiple (K) independent bit streams 18 corresponding to the data transmitted from the simultaneous users. The transmitted data signals are, in the case of CDMA wireless telephone systems, the digital equivalent of speech. Converting analog speech signals to digital data in a transmitter, and later converting the digital data back into speech, are accomplished by conventional techniques, which form no part of the present invention. As discussed above, each of the user data streams is subject to multiple access interference (MAI) because of the simultaneous presence of the other users' transmissions.

For processing in accordance with the MPIC method, the recovered multiple bit streams are first used to regenerate the transmitted signals again, but in independent form. As indicated in block 20, the data streams are again spread by modulation with the known appropriate spreading codes for the respective users, and adjustment in accordance with channel complex gain estimations. This is the first step in the first stage of MAI cancellation. Spreading the data signals yields K spreadspectrum signals, one for each of the K active transmitters #1, #2, and so forth, through #K, as indicated on lines 22. These signals are next partially summed in selected subsets, as indicated by summing circuits 24.1, 24.2 and 24.K. In summing circuit 24.1, all of the signals except the one associated with user #1 are summed, i.e. signals from users #2 through #K. In summing circuit 24.2, all of the signals except the one associated with user #2 are summed, i.e., signals from user #1 and other users from user #3 through user #K. In summing circuit 24.K, all of the signals except the one associated with user #K are summed. In general, for user #n (not shown), a summing circuit (not shown) adds all the user signals from users other than user #n.

The outputs from summing circuits 24.1 through 24.K represent estimates of MAI for users #1 through #K, respectively. These estimates are connected, respectively, as negative inputs to another set of summing circuits 26.1 through 26.K. Each of these summing circuits has as a positive input the original baseband signal prior to despreading, connected to the summing circuits 26.1 through 26.K over line 28. The outputs of the summing circuits 26.1 through 26.K are coupled to another set of matched filters 30, which despreads the signals once again and provides outputs on lines 32.1 through 32.K. Each of these lines is connected to a decision circuit 34.1 through 34.K, which reduces the signals to a pure binary form by deciding whether a "1" or a "0" is present at any time. The outputs of the decision circuits on lines 36.1 through 36.K are the respective user data signals after a first stage of multiple access interference cancellation.

The multiple signals are next subject to additional stages of interference cancellation, as indicated in block 40. Each successive stage of interference cancellation includes spreading the signals again, performing partial summations to compute an interference component for each user, subtracting these interference components from the received signals, despreading the results of the subtractions, and "cleaning" the resulting signals to include only binary values. Since each successive cancellation stage uses as inputs the user signals estimated in the immediately preceding stage, in theory the user signals will rapidly converge on corrected values. Unfortunately, because the method relies on accurate signal estimation of all users at every iteration, the method sometimes fails to converge on a solution, and may actually diverge if the bit error rate (BER) is high during the first few iterations and the MAI estimates are prone to error.

The MPIC method described above can be enhanced by taking advantage of multipath signal components that are commonly received by a single antenna. Especially in an urban environment, a transmitted signal may reach a receiving antenna both by a direct path and by one or more indirect paths involving reflections from buildings and other structures, refraction through the atmosphere. These multipath components can be separately demodulated and then combined for higher effective gain, using a technique known as maximum ratio combining (MRC), in which multipath components are selected based on their signal-to-noise ratio, and are coherently combined. Processing multipath components in this manner may be referred to as exploiting the "time diversity" of the received signals.

As mentioned in the "background" section of this specification, the MPIC technique may be enhanced by use of various weighting techniques, but all MPIC approaches are still subject to diverge from a correct solution for MAI if the bit error rate (BER) is too high.

Figure 2:
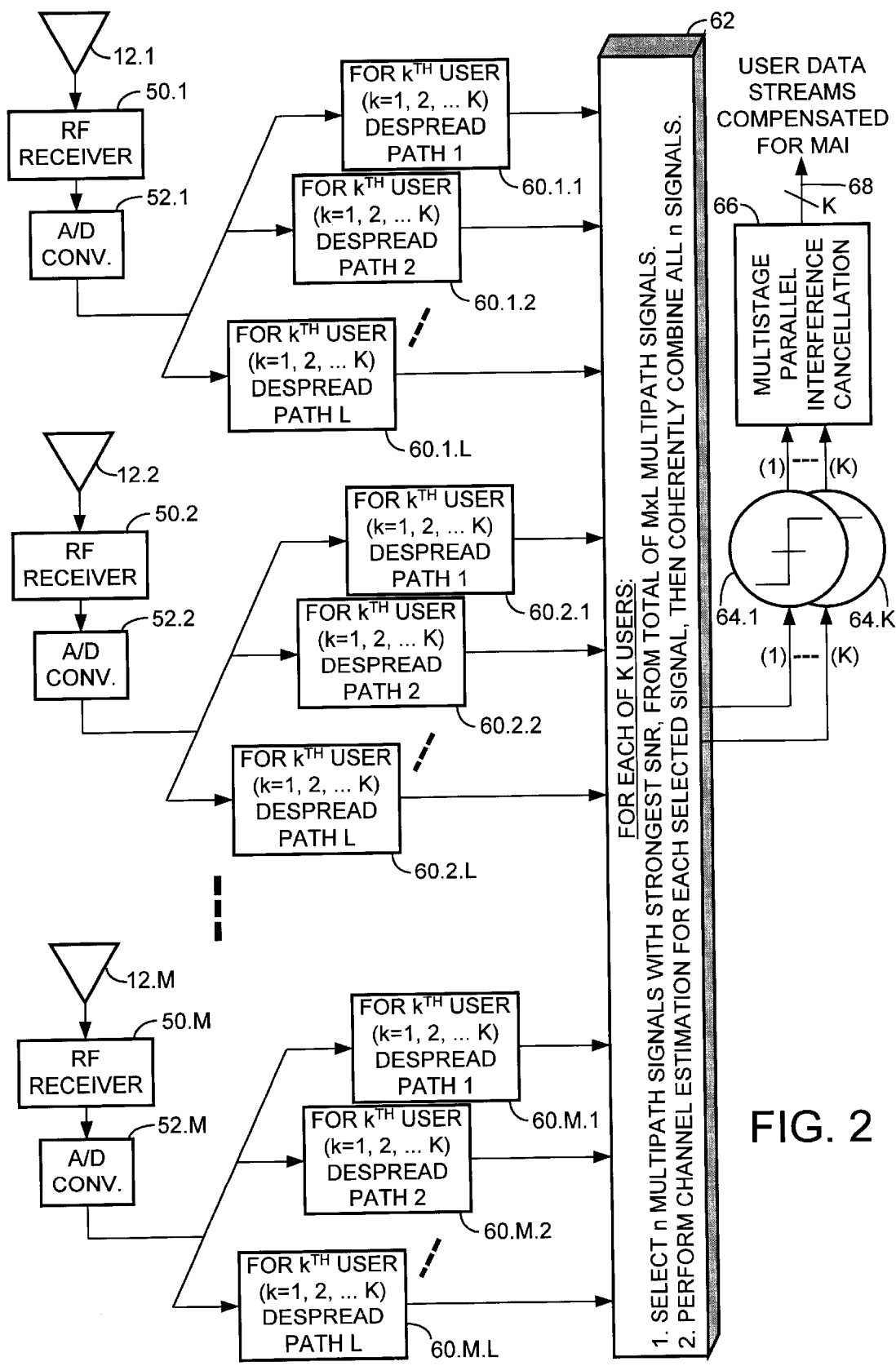
FIG. 2 is a block diagram illustrating the present invention, referred to as space-time diversity multistage parallel interference cancellation (STDMPIC), for reducing MAI in a CDMA communication system.

In accordance with the present invention, the advantage of time diversity is further enhanced by using multiple antennas through which to receive more multipath signal components, which are processed to produce effective and reliable cancellation of multiple access interference (MAI). FIG. 2 shows the presently preferred implementation of the method of the invention in diagrammatical form. Multiple antennas, three of which are shown at 12.1, 12.2 and 12.M, are spatially separated from each other, preferably by at least eight wavelengths, and receive the signals from multiple (K) users simultaneously. An antenna separation of a 8–10 wavelengths provides sufficient spatial diversity of the received signals, but is small enough to allow signals received at multiple antennas and derived from a single multipath component, to be coherently combined without the use of time delay circuitry. A separation of 8–10 wavelengths at a frequency of 900 MHz (megahertz) results in an equivalent time delay of approximately 0.01 $\mu$s (microseconds), which is only one percent of the multipath resolving time (1.0 $\mu$s) for the CDMA Interim Standard 95

(IS-95), specified by the United States Telecommunications Industry Association (TIA), or about $1/1000^{th}$ the multipath resolving time (0.3 μs) for W-CDMA, which is the third-generation (3G) CDMA standard specified by the International Telecommunications Union (ITU).

Signals from the antennas 12.1–12.M are first processed through respective radio-frequency (RF) receivers 50.1, 50.2–50.M, and then respective analog-to-digital (A/D) converters 52.1, 52.2–52.M. The RF receivers perform functions of detection of the received signals and frequency down-shifting, then the A/D converters produce corresponding digital signals for further processing.

The next function performed is one of despreading the received signals. As mentioned above, user signals are separately recoverable by means of banks of matched filters, which are constructed to recognize the unique spreading codes assigned to the users. In a simple CDMA receiver, one might find a single bank of K matched filters in operation, where K is the number of users. In the present invention, however, the despreading function is performed not only for each user, but also for each antenna and for each resolvable multipath signal received. Thus, signals derived from the first antenna 12.1 are connected to L despreaders, designated by reference numerals 60.1.1 and 60.1.2 through 60.1.L, where L is the number of resolvable multipath signals that may be received and processed. Similarly, the second antenna 12.2 supplies signals to L additional despreaders, designated by reference numerals 60.2.1, and 60.2.2 through 60.2.L. For antenna M, there are L additional despreaders, designated by reference numerals 60.M.1 and 60.M.2 through 60.M.L.

The despreaders 60 produce as many as M×L signals for each user. it will be understood, however, that although the described hardware has been constructed to receive as many as L resolvable multipath signals, a smaller number of multipath signals may be received. Processing of these M×L signals continues In block 62, which performs two functions on the signals received from the despreaders 60. First, for each user a selection is made from the M×L signals, using the signal-to-noise ratio (SNR) as a selection criterion. Specifically, a subset of n signals having the strongest SNR is selected. The chosen subset may, In some instances, include the full set of M×L signals.

The second function performed in processing block 62 is to coherently combine the selected n signals for each user, after first performing channel estimation for each selected signal, i.e., the bit values for each selected signals are estimated, then the selected signals are coherently combined. Coherent combination of the signals involves estimating the amplitude and phase of the signals, and this can be done with the help of a pilot signal that is a component of standard CDMA signals. The pilot signal, which may be a dedicated pilot channel or pilot inserted symbols, facilitates estimation of the channel complex gain for each selected signal. Because the selected signals in general follow different propagation paths, they are subject to different changes in amplitude and phase, i.e., they are subject to different complex gain values. The complex gain of each channel must first be estimated to allow the signals to be coherently combined. Further, multipath signals are inherently offset in time with respect to each other, and must be synchronized for coherent addition of the signals. When selecting the same multipath component from different antennas, timing information can be usefully shared to facilitate processing. Processing block 62 outputs a single composite signal for each of the K users, derived from the selection of n signals made in the processing block. These K signals are forwarded to K estimators 64 for final bit estimation, and then transmitted to a conventional multistage parallel interference; cancellation (MPIC) processor 66. The latter circuit may be of the type illustrated in FIG. 1. Since MPIC includes weighting signals in accordance with estimated channel complex gains, this step is facilitated in the present invention because the channel complex gains have already been estimated in order to coherently combine the selected multipath signals. The user signal outputs from the MPIC circuit 66, on lines 68, are relatively free of multiple access interference. Therefore, a communication system employing this technique has both increased capacity and improved voice quality.

It will be understood that FIG. 2 depicts what is presently believed to be the optimum technique for selecting and combining multipath signal components received at multiple antennas. Various specific implementations may be employed to perform coherent combination of the selected signals. For example, the n selected signals may, for convenience, be derived as a subset of 1 multipath components from a subset of m antennas. For each multipath component the selected m antenna signals could be first combined, then the multipath components coherently combined to obtain a composite signal for each user. In an alternative, but not presently preferred approach within the scope of the present invention, selected multipath components received at each of the antennas could be first coherently combined to obtain a single signal for each antenna (for each user). Then these signals from selected antennas could be combined to obtain the single composite signal for each user. Stated more generally, however, an important principle of the invention is selection of n multipath signal components from a total of M×L multipath signal components supplied from the M antennas, (where n≦M×L), and then coherent combination of the selected n signals.

The outputs from the estimators 64 represent the best available estimates for the K user signals. The SNR for each user has been maximized by use of both time and space diversity of the incoming signals and provides a better set of starting estimates than is typically used in MPIC processing. Moreover, the user signal estimates obtained in accordance with invention have a lower bit error rate (BER) and MAI cancellation is achieved more accurately at every stage of MPIC processing.

Figure 3:
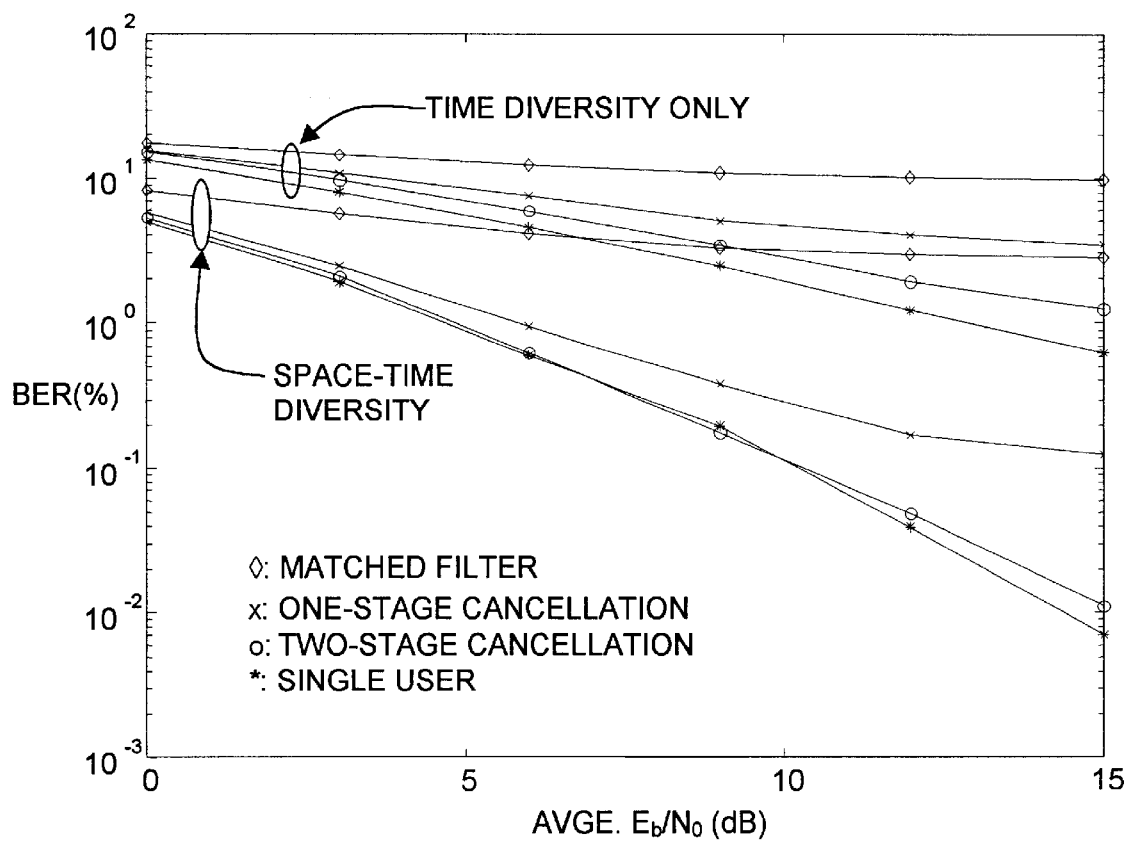
FIG. 3 includes two sets of graphs showing the variation of bit error rate with signal-to-noise ratio, using time diversity (the upper set of curves) for MAI cancellation, and using space and time diversity in accordance with the invention (lower set of curves) for MAI cancellation.

FIG. 3 graphically shows the advantage the invention achieves over a method based on time diversity alone. There are two sets of four curves plotted in FIG. 3. The horizontal axis plots the average ratio of $E_b/N_0$, or signal-to-noise ratio (SNR) ratio in decibels (dB). The vertical axis plots the bit error rate (BER) as a percentage and on a logarithmic scale. The upper set of four curves were derived using time diversity alone, i.e., without the benefit of the present invention. The uppermost curve, with the plot points denoted by a diamond (◊), were obtained using only a matched filter to separate the multiple user signals, i.e., with no MAI cancellation. The curve having plotted points denoted by an 'x' symbol were obtained using one stage of MIA cancellation. The curve having plotted points denoted by an 'o' symbol were obtained by using two stages of MIA cancellation. Finally, the curve having plotted points denoted by an asterisk (*) represent a single-user case, in which there is no multiple access interference to cancel. It will be observed that the upper (matched filter) curve is relatively flat. That is to say, the bit error rate (BER) does not change much as the average SNR is increased by up to 15 dB. The other three of the upper set of curves, using time diversity only, show that, in each case, the BER decreases as SNR increases. It is also apparent from the curves that the performance of the two-stage cancellation scheme (plotted with the 'o' symbol) is significantly worse than the single-user case (plotted with the * symbol). Specifically, to obtain a given bit error rate (BER) the signal-to-noise ratio (SNR) in the two-stage cancellation scheme must be approximately 3 dB greater than the SNR for the single-user case and the same BER. Stated another way, for a given SNR, use of the twostage cancellation scheme results in a significantly higher BER than the single-user case.

The lower set of curves show the dramatic result of using space diversity with time diversity in conjunction with one-stage and two-stage MPIC for MAI cancellation. Space-time diversity in conjunction with a two-stage MPIC circuit achieves a significant improvement in BER relative to MPIC alone. In addition, the two lower curves of the set show that the performance for two-stage cancellation using space-time diversity closely matches the single-user case.

It will be appreciated from the foregoing that the present invention represents a significant advance in the field of CDMA communication systems. In particular, the invention provides a more reliable approach for cancellation of multiple access interference. Using space and time diversity not only provides an initial signal of higher signal-to-noise ratio (SNR), but also results in improved MAI cancellation at every stage because of a lower bit error rate (BER). In other words, every stage of MPIC benefits from the space and time diversity gain, which results in rapid convergence to the performance of a single user, as shown in FIG. 3.

It will be apparent to those familiar with CDMA design that the principle of the invention applies to cancellation of MAI both in base stations and in mobile stations. The invention has been described with MAI cancellation in base stations principally in mind, wherein a base station may receive simultaneous transmissions from multiple mobile stations. These are referred to as reverse-link transmissions. In a forward-link transmission from a base station to multiple mobile stations, each mobile station's signal may be subject to MAI resulting from simultaneous transmissions to other mobile stations. As implemented in a mobile station, the present invention operates in the same manner as in a base station, by receiving signals at multiple antennas, selecting from among multipath signals associated with each user, and coherently combining the selected signals to obtain a high-SNR estimate of each user signal. Then MAI is canceled using MPIC, but only with respect to the user associated with this particular mobile unit. Although the relatively low operating frequencies of earlier and some existing CDMA designs would render the use of multiple antennas on mobile unit impractical, the so-called third-generation (3G) standard operates at 1.9 GHz (gigahertz), allowing practical implementation of multiple antennas, to provide space diversity in a hand-held mobile unit.

It will also be appreciated that various modifications may be made without departing from the spirit and scope of the present invention. Accordingly, the invention should not be limited except as by the appended claims.

What is claimed is:

1. A method for cancellation of multiple access interference (MAI) in a code division multiple access (CDMA) communication system, the method comprising the steps of:
    (a) receiving signals from multiple users of a CDMA communication system simultaneously, at a plurality (M) of spatially separated antennas, wherein at least some of the signals reach the antennas as multipath components traversing a plurality of (L) of different propagation paths;
    (b) converting the received signals to digital form;
    (c) separating signals received at each antenna by multipath component and by user, to provide as many as M×L signals for each user;
    (d) for each user, selecting a number, n, of signals from the M×L signals provided in step (c), wherein n is less than or equal to M×L, and wherein the n signals are selected as having relatively high signal-to-noise ratio;
    (e) coherently combining the n signals selected in step (d), to produce a high signal-to-noise ratio (SNR) combined signal for each user; and
    (f) performing multistage parallel interference cancellation on the user combined signals obtained in step (e);
    whereby the method employs both time and space diversity to provide a more accurate estimate of user signals, and multiple access interference is more reliably canceled.

2. A method as defined in claim 1, wherein the step (e) of coherently combining is immediately followed by an additional step of determining, at each interval of a time clock, the binary value of the single combined signal for each user.

3. A method as defined in claim 1, wherein the step (f) of performing multistage parallel Interference cancellation includes:
    spreading the separate combined user signals, using spreading codes uniquely associated with the users;
    computing a set of estimated MAI cancellations, obtained as partial sums of the spread signals, wherein the partial sum for each user is computed as the sum of all of the other user's signals;
    subtracting each partial sum from the received signal, to obtain a first estimate of spread user signals compensated for MAI;
    despreading the spread user signals compensated for MAI in the preceding step; and
    repeating the preceding steps as desired to obtain more accurate estimates of the user signals compensated for MAI.

4. A method for cancellation of multiple access interference (MAI) in a code division multiple access (CDMA) communication system, the method comprising the steps of:
    simultaneously receiving, at spatially separated multiple antennas, signals transmitted from multiple users, the signals from at least some of the users following multiple propagation paths and arriving at the antennas as resolvable multipath components;
    for each user signal, selecting from among all of the multipath components received at all of the antennas a subset of resolvable multipath components of the user signal that provides the highest signal-to-noise ratio;
    coherently combining the selected subset of multipath components to obtain for each user a single combined received signal for which signal-to-noise ratio has been maximized by use of space and time diversity;
    estimating multiple access interference (MAI) for each user; and
    subtracting the estimates from the received signals to obtain estimates of the user signals compensated for MAI.

5. A method as defined in claim 4, wherein the steps of generating estimates of MAI and subtracting them from the received signals are performed by multistage parallel interference cancellation.

6. Receiver apparatus for cancellation of multiple access interference (MAI) in a code division multiple access (CDMA) communication system, the apparatus comprising:

multiple antennas for receiving signals from multiple users transmitting simultaneously to the receiver apparatus, the signals from at least some of the users being received as multipath components traversing direct and indirect paths;

multiple radio-frequency (RF) receivers coupled to respective antennas;

signal processing means coupled to each antenna, for separating the received signals by user and by multipath component;

means for selecting for each user a subset of signals from all of the multipath components received through all of the antennas, wherein the selection is made on the basis of maximizing signal-to-noise ratio;

means for coherently combining the selected signals for each user, to obtain an initial set of estimated user signals with high signal-to-noise ratios; and a multistage parallel interference cancellation (MPIC) circuit, connected in a cascade arrangement with the foregoing apparatus elements, to provide cancellation of multiple access interference cancellation that operates to reduce bit error rate for each user, whereby the initial set of estimated user signals derived by the apparatus provides more efficient reliable operation of the MPIC circuit.

7. A method for cancellation of multiple access interference (MAI) in a code division multiple access (CDMA) communication system, the method comprising the steps of:

simultaneously receiving, at spatially separated multiple antennas, multiple user signals associated with multiple users, wherein at least some of the signals follow multiple propagation paths and arrive at the antennas as resolvable multipath components;

for each user signal, selecting from among all of the multipath components received at all of the antennas a subset of resolvable multipath components of the user signal that provides the highest signal-to-noise ratio;

coherently combining the selected subset of multipath components to obtain for each user a single combined received signal for which signal-to-noise ratio has been maximized by use of space and time diversity;

estimating multiple access interference (MAI) from the single combined received signals obtained in the coherently combining step; and using the estimates of MAI obtained in the estimating step, to compensate for MAI.

* * * * *